United States Patent Office 3,472,844
Patented Oct. 14, 1969

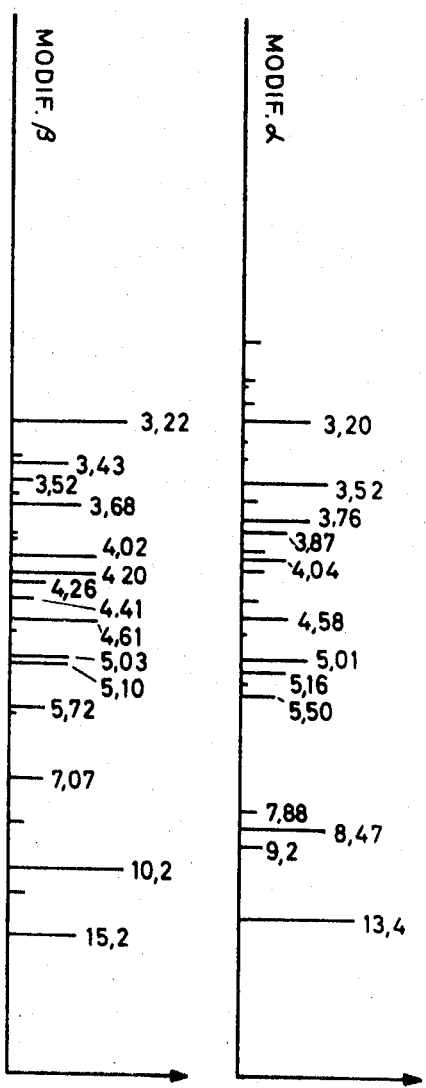

3,472,844
MODIFICATION OF 2:6-DIBENZOYLAMINO-3:7 - DIETHOXY - 9:10 - DIACETYLAMINO-TRIPHENDIOXAZINE
Christoph Frey, Oberwil, Basel-Land, August Hecker, Muenchenstein, Rudolf Mueller, Therwil, and Werner Surber, Bottmingen, Switzerland, assignors to Ciba Limited, Basel, Switzerland, a company of Switzerland
Filed Oct. 18, 1966, Ser. No. 587,512
Claims priority, application Switzerland, Oct. 28, 1965, 14,901/65; Aug. 31, 1966, 12,617/66
Int. Cl. C07d 87/02; C09b 19/00; B32b 29/00
U.S. Cl. 260—246                              1 Claim

ABSTRACT OF THE DISCLOSURE

A new violet pigment form of 2:6-dibenzoylamino-3,7-diethoxy-9,10-diacetylamino-triphendioxazine in the β-crystal phase is obtained when 2,5-diacetylamino-3,6-di(2',5' - diethoxy - 4' - benzoylamino) - 1,4 - benzoquinone is heated in nitrobenzene in the presence of additives favoring the formation of the β-modification, illustratively water, for a prolonged period at a temperature above 150° C.

---

It is known that when 2,5-diacetylamino-3,6-di-(2',5'-diethoxy - 4' - benzoylamino - phenylamino) - 1,4 - benzoquinone is heated in ortho-dichlorobenzene the 2,6-dibenzoylamino - 3,7 - diethoxy - 9,10 - diacetylamino - triphendioxazine of the formula

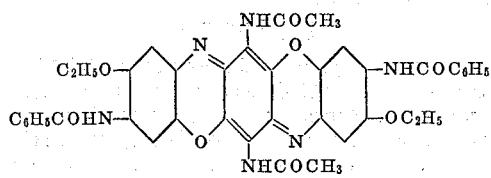

is obtained by ring closure at both ends (see Swiss specification No. 376,202). Under the reaction conditions mentioned in that specification a blue-violet modification is obtained which is hereinafter called the α-modification. It is characterized by the following lines in the X-ray powder diagram:

Lattice constant or
d-value in angstrom:            Intensity of the line
  13.4 _____ Very high.
  9.2 _____ Low to medium.
  8.47 _____ High.
  7.88 _____ Low.
  5.50 _____ Medium.
  5.16 _____ Do.
  5.01 _____ Medium to high.
  4.58 _____ Medium.
  4.04 _____ Do.
  3.87 _____ Do.
  3.76 _____ Medium to high.
  3.52 _____ High.
  3.20 _____ Medium to high.

For clarity's sake the d-values are shown in the accompanying drawings as the abscissa and the intensity of the line as the ordinate.

In addition, further weak to very weak lines appeared at the following d-values: 4.72, 4.43, 4.14, 4.10, 3.97, 3.65, 3.40, 3.31, 3.12, 3.04, 3.00 and 2.85 Angstrom.

The present invention is based on the observation that a new red-violet crystal form (hereinafter called the β-modification) of 2,6-dibenzoylamino-3,7-diethoxy-9,10-diacetylaminotriphendioxazine is obtained when 2,5-diacetylamino - 3,6 - di - (2',5' -diethoxy - 4' - benzoylamino)-1,4-benzoquinone is heated in nitrobenzene in the presence of additives that favour the formation of the β-modification for a prolonged period at a temperature above 150° C., or by heating the α-form of 2,6-dibenzoylamino - 3,7 - diethoxy - 9,10 - diacetylaminotriphendioxazine in nitrobenzene for a prolonged period at a temperature above 160° C.

Water may be mentioned as an example of an additive that favour the formation of the β-form. It is advantageous to use at least 5 parts of the additive for every 100 parts of nitrobenzene. Further suitable additives are bases, for example, ammonia or its salts with weak acids, for example, ammonium acetate or ammonium carbonate, as well as amines or amides that contain at least one hydrogen atom attached to nitrogen, for example, aminobenzenes, for example, aniline, para-aminophenol, toluidines or anisidines. Ethanolamine, diethanolamine and urea can also be used. It is advantageous to use at least 0.05 part of the amine or amide for every 100 parts of nitrobenzene. It is also possible to use a combination of water and the base, for example, aqueous ammonia. It has proved particularly advantageous to add the preformed β-modification of 2,6-dibenzoylamino - 3,7 - diethoxy-9,10-diacetylamino-triphendioxazine. In this case, too, a small addition suffices, for example, 0.01 part for every part of the α-modification.

When the closure of the dioxazine ring is carried out in nitrobenzene, subsequent prolonged heating in nitrobenzene suffices for conversion into the β-form. In this case it must be assumed that the substance which favours formation of the β-modification is formed as a by-product during the ring closure.

The reaction time is advantageously about 6 hours.

The pigment is isolated in the usual manner by filtering and washing the precipitate.

The new β-modification is characterized by the following lines in the X-ray powder diagram:

Lattice constant or
d-value in angstrom:            Intensity of the line
  15.2 _____ Medium to high.
  10.2 _____ Very high.
  7.07 _____ Low to medium.
  5.72 _____ Do.
  5.10 _____ Medium.
  5.03 _____ Do.
  4.61 _____ High.
  4.41 _____ Low.
  4.26 _____ Low to medium.
  4.20 _____ High.
  4.02 _____ Do.
  3.68 _____ Medium to high.
  3.52 _____ Low.
  3.43 _____ Medium.
  3.22 _____ Very high.

(see also the accompanying drawing).

In addition, further weak to very weak lines appear at the following d-values: 11.6, 8.34, 4.73, 3.91, 3.87, 3.61 and 3.40 Angstrom.

The β-modification possesses fastness properties equal to those of the α-modification and is moreover distinguished by a particularly valuable reddish violet shade and may be used like the α-modification for all pigment applications, for example for dyeing rayon and viscose or cellulose ethers or esters or polyamides, polyurethanes or polyesters in the spinning composition. It may also be used for the manufacture of coloured lacquers or lake formers, solutions or products of acetylcellulose, nitrocellulose, natural or synthetic resins for example polymerization resins or condensation resins, for example aminoplasts, alkyd resins, phenoplasts, polyolefines for example polystyrene, polyvinylchloride, polyethylene, polypropylene, polyacrylonitrile, rubber, casein, silicone and silicone resins. It can also be used with advantage in the manufacture of coloured pencils or laminated panels.

Unless otherwise indicated, parts and percentages in the following examples are by weight.

The X-ray diffraction diagrams are obtained by the usual powder method, the diffraction projection being recorded on films and the photographs taken with a Guinier-de Wolff camera with quartz monochromator; $CuK_{\alpha1,2}$ radiation. From the angles of reflection of the X-rays the associated lattice constants are calculated in the usual manner. For the accurate measurement of these angles cubic ammonium-aluminium sulphate dodecahydrate $[NH_4Al(SO_4)_2 \cdot 12H_2O]$ is used as calibrating substance and for its lattice constant the value of $a = 12.240 \pm 0.002$ A. is taken. The relative intensities of the lines are estimated. The lattice constants of one and the same modification reveal a natural scatter width; for lattice constants above 10 Angstrom it is ±5% relative and for lattice constants below 10 Angstrom it is ±2% relative.

EXAMPLE 1

82 parts of 2,5-diacetylamino-3,6-di-(2′,5′-diethoxy-4′-benzoylamino - phenylamino) - 1,4 - benzoquinone [obtained by condensing 2,5-diacetylamino-3,6-dichloro-1,4-benzoquinone and 1-amino-4-benzoylamino-2,5-diethoxybenzene in isopropanol in the presence of sodium acetate] are heated in 600 parts of nitrobenzene, 55 parts of water and 1 part of 2,5-diacetylamino-3,6-dichloro-1,4-benzoquinone within 6 hours to 180 to 185° C. while being well stirred, whereby the water and the alcohol set free by the closure of the dioxazine ring distill off. The batch is stirred for another 4 hours at this temperature, then allowed to cool to 120° C., filtered, and the filter residue is washed with nitrobenzene heated at about 120° C., rinsed with methanol and water and dried under vacuum at about 100° C. The β-modification of 2,6-dibenzoylamino - 3,7 - diethoxy -9,10 - diacetylamino - triphendioxazine is thus obtained. When this β-modification is finely comminuted and rolled into polyvinylchloride, reddish violet foils having very good migration and light fastness are obtained.

When the α-modification is conditioned in identical manner and is rolled into polyvinylchloride, bluish violet films result.

EXAMPLE 2

When the 55 parts of water are replaced in Example 1 by only half this quantity, the procedure being otherwise identical, the same result is obtained.

EXAMPLE 3

475 parts of isopropanol are heated to 55° C., then 180 parts of 1-amino-4-benzoylamino-2,5-diethoxybenzene, 49.5 parts of anhydrous sodium acetate and 87.5 parts of 2,5-diacetylamino-3,6-dichloro-1,4-benzoquinone are added. The mixture is gently boiled under reflux and stirred for 3 hours, allowed to cool to room temperature, filtered, and the filter residue is washed with cold isopropanol and water. A yield of 540 parts of a moist filtercake is obtained which contains about 245 parts of 2,5 - diacetylamino - 3,6 - di - (2′,5′ - diethoxy - 4′-benzoyl - amino - phenylamino) - 1,4 - benzoquinone and about 295 parts of water.

A mixture of the above moist filter cake, 1,800 parts of nitrobenzene and 3 parts of 2,5-diacetylamino-3,6-dichloro-1,4-benzoquinone is stirred and heated within 6 hours to 175° C. while distilling off the water and the alcohol formed. The batch is stirred for another 3 hours at this temperature, allowed to cool to 120° C., filtered and washed with hot nitrobenzene, methanol and water. After drying under vacuum at 100° C. the β-modification of 2,6-dibenzoylamino-3,7-diethoxy-9,10-diacetylamino-triphendioxazine is obtained.

EXAMPLE 4

A mixture of 82 parts of 2,5-diacetylamino-3,6-di(2′,5′ - diethoxy - 4′ - benzoylamino - phenylamino) - 1,4-benzoquinone, 600 parts of nitrobenzene, 1 part of 2,5-diacetylamino-3,6-dichloro-1,4-benzoquinone and 1.25 parts of aniline is slowly heated within 6 hours to 180° C., whereby the alcohol resulting from the dioxazine ring closure distills off. The batch is stirred for another 4 hours at 180 to 185° C., allowed to cool to 120° C., filtered, washed with hot nitrobenzene, cold methanol and water and dried under vacuum at 100° C., to yield the β-modification of 2,6-dibenzoylamino-3,7-diethoxy-9,10-diacetylamino-triphendioxazine.

The β-modification is also obtained when in this example the aniline is replaced, for example, by 5 parts of para-amino-phenol, 10 parts of ammonium acetate, 10 parts of aqueous ammonia of 2% concentration or 5 parts of urea, 1 part of the β-modification of 2,6-dibenzoylamino-3,7-diethoxy-9,10 - diacetylamino - triphenodioxazine, 2 parts of diethanolamine or 5 parts of N-methylaniline.

EXAMPLE 5

5 parts of the dioxazine pigment obtained according to Example 22 of Swiss specification No. 376,202 by boiling 2,5 - diacetylamino-3,6-di-(2′,5′-diethoxy-4′-benzoylaminophenylamino)-1,4-benzoquinone for 4 hours in nitrobenzene are refluxed for 8 hours in 100 parts by volume of nitrobenzene. After allowing the batch to cool, it is filtered and the filter residue is washed with 100 parts by volume of methanol, then with hot water and finally dried under vacuum at 120° C. The pigment obtained in this manner displays in the X-ray diffraction diagram the lines characteristic of the β-modification.

EXAMPLE 6

A mixture of 5 parts of the α-form of 2,6-dibenzoylamino-3,7-diethoxy-9,10-diacetylamino - triphendioxazine, 0.05 part of the β-form and 100 parts of nitrobenzene is refluxed for 8 hours, and then worked up as described in Example 5. All the resulting pigment is in the β-modification. An identical result is obtained when the 0.05 part of the β-modification is replaced by 3.5 parts of aniline or 3.5 parts of formamide.

EXAMPLE 7

A mixture of 5 parts of the β-modification of 2,6-dibenzoylamino - 3,7 - diethoxy-9,10-diacetylamino-triphendioxazine and 95 parts of dioctylphthalate is ground in a ball mill until the dyestuff particles have been reduced to a size below 3μ.

A mixture of 0.8 part of this dioctylphthalate paste, 13 parts of polyvinylchloride, 7 parts of dioctylphthalate, 0.1 part of cadmium stearate and 1 part of titanium dioxide is then rolled for 5 minutes on a two-roll mill at 140° C.

The resulting violet colouration is very fast to light and migration.

EXAMPLE 8

A mixture of 40 parts of a nitrocellulose lacquer, 2.375 parts of titanium dioxide and 0.125 part of the β-modification of 2,6-dibenzoylamino-3,7-diethoxy-9,10-diacetylamino-triphendioxazine is ground for 16 hours in a rod mill. The resulting lacquer is applied in the form of a thin brush coat to an aluminium foil. The resulting violet lacquer coating displays very good fastness properties.

EXAMPLE 9

A mixture of 25 parts of the β-modification of 2,6-dibenzoylamino - 3,7 - diethoxy-9,10-diacetylamino-triphendioxazine, 25 parts of acetylcellulose (containing 54.5% of combined acetic acid), 100 parts of sodium chloride and 50 parts of diacetone alcohol is treated in a kneader while being cooled until the pigment has attained the desired fineness. 25 parts of water are then added and the whole is kneaded until a finely granular mass has formed which is placed on a suction filter and exhaustively washed with water to remove the sodium chloride and the diacetone alcohol. The product is dried in a vacuum cabinet at 85° C. and then comminuted in a hammer mill.

1.33 parts of the resulting pigment preparation are added to an acetate rayon spinning mass consisting of 100 parts of acetylcellulose and 376 parts of acetone. The whole is stirred for 3 hours, which is sufficient to ensure complete distribution of the dyestuff. A filament spun from this mass and dried in the usual manner displays a violet shade which possesses good properties of fastness.

EXAMPLE 10

A mixture of 0.25 part of the β-modification of 2,6-dibenzoylamino - 3,7 - diethoxy-9,10-diacetylamino-triphendioxazine, 40 parts of an alkyd-melamine stoving lacquer (containing 50% of solids) and 4.75 parts of titanium dioxide is ground for 24 hours in a rod mill. The resulting lacquer is brushed in a thin coating over an aluminium foil and stoved for one hour at 120° C. The resulting violet lacquer coating displays good fastness to light.

EXAMPLE 11

A mixture of 4.8 parts of the β-modification of 2,6-dibenzoylamino - 3,7 - diethoxy-9,10-diacetylamino-triphendioxazine, 4.8 parts of the sodium salt of 1,1'-dinaphthylmethane-2,2'-disulphonic acid and 22.1 parts of water is ground in one of the known colloid mills until all dyestuff particles are smaller than 1μ. The pigment suspension obtained in this manner contains about 15% of pigment.

When this aqueous suspension is added to a viscose rayon spinning mass which is then spun by a usual spinning method, a violet coloured cellulose filament is obtained which has good fastness properties.

EXAMPLE 12

A dyebath is prepared which contains per 1,000 parts of water 15 parts of a copolymer latex from 85.8 parts of isobutylacrylate, 9.6 parts of acrylonitrile and 4.6 parts of acrylic acid, 15 parts of an emulsion of 70% concentration of a methylolmelamine allyl ether emulsified with Turkey red oil and modified with soya bean fatty acid, 50 parts of a water-soluble methyl ether of a urea-formaldehyde condensation product which contains per mol of urea more than 2 mols of formaldehyde as a condensation component, 5 parts of a pigment suspension obtained as described in Example 11, first paragraph, and 20 parts of 10% formic acid.

Dry cotton fabric is immersed at room temperature in the above dyebath, squeezed on a padder to a weight increase of 65 to 80%, dried in the normal way if necessary under tension (clip or pin stenter) and finally hardened for 5 minutes at 145 to 150° C.

The resulting violet dyeing has good fastness properties.

EXAMPLE 13

A mixture of 100 parts of the β-modification of 2,6-dibenzoylamino - 3,7 - diethoxy-9,10-diacetylamino-triphendioxazine, 40 parts of an adduct from 15 mols of ethylene oxide with 1 mol of di-tertiary-butyl-paracresol and 20 parts of water is converted in a kneader into a tough, homogeneous dough and then further kneaded until the dyestuff agglomerates obtained on drying are evenly and finely dispersed. While continuing the kneading of the dough it is carefully diluted with 90 parts of water and finally homogenized by means of a funnel mill or another suitable device until it forms a ropy, homogeneous paste which contains substantially exclusively dispersed dyestuff primary particles not exceeding a diameter of 3μ. 250 parts of a violet paste containing 40% of pigment are obtained.

60 parts of this paste are converted into a homogeneous, ropy paste with 850 parts of an oil-in-water emulsion containing 55% of petroleum hydrocarbons, 5% of a styrene-butadiene emulsion copolymer, and 3.5% of a solution consisting of about 75% by weight of a water-insoluble melamine-formaldehyde primary condensate modified with n-butanol and about 25% by weight of n-butanol as the separate inner phase, and 36.5% of an aqueous solution containing 7.5 parts by weight of a nonionic emulsifier prepared as described in Example 3 of Swiss specification No. 339,194 and 92.5 parts by weight of water as the outer phase, 80 parts of water and 10 parts of ammonium nitrate, in all 1,000 parts.

The above paste can be printed on fabrics from natural or regenerated cellulose or from synthetic fibers of various types by means of rollers or stencils. After drying at room temperature or with heating, followed by a heat treatment for a few minutes at 120 to 150° C., violet print effects are obtained which display excellent fastness to abrasion, washing and light.

EXAMPLE 14

A mixture of 50 parts of the β-modification of 2,6-dibenzoylamino - 3,7 - diethoxy-9,10-diacetylamino-triphendioxazine, 100 parts of Staybelite Ester 10 (glycerin ester of hydrogenated colophony), 200 parts of sodium chloride and 18 parts of diacetone alcohol is treated in a kneader while being cooled until the desired fineness of the pigment has been attained. The sodium chloride and the diacetone alcohol are then washed out of the dough by introducing water at 80° C., during which the dough itself remains intact. The dough thus freed from salt and solvent is completely dried by heating the kneader with steam, then allowed to cool and comminuted in the kneader.

The preparation is suitable, for example, for colouring lacquers; for this purpose it is advantageously pasted with a small quantity of toluene and the resulting paste is stirred together with the lacquer.

EXAMPLE 15

For manufacturing a laminate the following layers were prepared: (a) Tough paper from unbleached sulphite cellulose (so-called kraft paper) is impregnated with an aqueous solution of a phenol-formaldehyde resin, pressed and dried. (b) Paper from pure, chemically bleached cellulose (containing zinc sulphide or titanium dioxide as filler) is impregnated with a 50% aqueous solution of dimethylolmelamine, pressed and dried at 100° C. (c) 400 parts of a decorative paper from bleached cellulose, containing zinc sulphide or titanium dioxide as filler, are disintegrated in a hollander with 10,000 parts of water, and this paper pulp is mixed with 30 parts of the pigment suspension obtained as described in Example 11. The pigment is fixed by adding 16 parts of aluminium sulphate. The dyed decorative paper is impregnated in a 50% aqueous solution of dimethylolmelamine, pressed and dried at 100° C. (d) A top grade laminate is obtained by protecting the decorative paper with tissue paper from bleached special cellulose weighing 40 grams per square metre. The tissue paper is likewise impregnated with a 50% aqueous solution of dimethylolmelamine, pressed and dried at 100° C.

Sheets of the material prepared in this manner, of equal size, for example 2.75 x 1.25 m., are stacked as follows: First 3 to 5 sheets of paper (a), 1 sheet of paper (b), 1 sheet of paper (c) and, if desired, 1 sheet of paper (d), and this sandwich is compressed between mirror-chromed platens for 12 minutes at 140 to 150° C. under a pressure of 100 kg./cm.², then cooled to 30° C. and the laminate thus formed is removed from the press. On one side it is violet and this colour is very fast to light.

EXAMPLE 16

A mixture of 1 part of the β-modification of 2,6-dibenzoylamino-3,7 - diethoxy - 9,10 - diacetylamino - triphendioxazine and 99 parts of high-pressure polyethylene is rolled for 10 minutes at 140 to 170° C. in a calender. The resulting violet foil possesses excellent fastness to light and migration. These foils may be granulated and the granulates used for injection moulding or for foil blowing.

EXAMPLE 17

0.5 part of the β-modification of 2,6-dibenzoylamino-3,7 - diethoxy - 9,10 - diacetylamino - triphendioxazine are sprinkled dry over 99.51 parts of isotactic polypropylene in chip form. The coated chips are then melted at 180 to 220° C. and pressed through a nozzle. A violet polypropylene tape is obtained which can be granulated after cooling and the granulates thus obtained may be used for injection moulding.

EXAMPLE 18

2 parts of the β-modification of 2,6-dibenzoylamino-3,7-diethoxy - 9,10-diacetylamino - triphendioxazine are mixed with 1,000 parts of the polystyrene granulate for one hour in a revolving drum, whereby the polystyrene particles are coated with a layer of pigment. The resulting product is extruded at 140 to 155° C. A violet tape is obtained.

What is claimed is:

1. As a violet pigment 2:6-dibenzoylamino - 3,7-diethoxy - 9,10 - diacetylamino - triphendioxazine in the β-crystal phase, characterized by an X-ray diffraction pattern exhibiting two lines of very high intensity corresponding to an interplanar spacing of 10.2 and 3.22 A., three lines of high intensity corresponding to an interplanar spacing of 4.61, 4.20 and 4.02 A., two lines of medium to high intensity corresponding to an interplanar spacing of 15.2 and 3.68 A., three lines of medium intensity corresponding to an interplanar spacing of 5.10, 5.03 and 3.43 A., three lines of low to medium intensity corresponding to an interplanar spacing of 7.07, 5.72 and 4.26 A. and two lines of low intensity corresponding to an interplanar spacing of 4.41 and 3.52 A.

References Cited

UNITED STATES PATENTS

| | | | |
|---|---|---|---|
| 2,026,092 | 12/1935 | Kränzlein et al. | 260—246 |
| 2,143,598 | 1/1939 | Greune et al. | 260—246 |
| 2,278,260 | 3/1942 | Greune et al. | 260—246 |
| 3,065,229 | 11/1962 | Ronco | 260—246 |
| 3,309,213 | 3/1967 | Pugin et al. | 260—246 |

FOREIGN PATENTS 376,202    5/1964    Switzerland.

HENRY R. JILES, Primary Examiner

NATALIE TROUSOF, Assistant Examiner

U.S. Cl. X.R.

8—54.2, 55, 57, 62, 63; 106—165, 176; 117—155; 161—263, 268; 260—37, 38, 39, 40, 41